United States Patent [19]

Tarui et al.

[11] 3,860,916

[45] Jan. 14, 1975

[54] OPTICAL INFORMATION STORAGE DEVICE

[75] Inventors: Yasuo Tarui; Yoshio Komiya; Tsunenori Sakamoto, all of Tokyo, Japan

[73] Assignee: Agency of Industrial Science & Technology, Tokyo, Japan

[22] Filed: Mar. 30, 1973

[21] Appl. No.: 346,359

[30] Foreign Application Priority Data

Mar. 30, 1972 Japan .............................. 47-31129

[52] U.S. Cl. ........................ 340/173 LS, 340/173 R

[51] Int. Cl. ............................................ G11c 11/42

[58] Field of Search ................... 340/173 R, 173 LS

[56] References Cited

UNITED STATES PATENTS

| | | | |
|---|---|---|---|
| 3,500,142 | 3/1970 | Kahng | 340/173 R |
| 3,746,867 | 7/1973 | Phela | 340/173 R |

*Primary Examiner*—Terrell W. Fears
*Attorney, Agent, or Firm*—Kurt Kelman

[57] ABSTRACT

Disclosed is an optical information storage device using a composite structure of Conductor-Insulator-Semiconductor. A large number of such devices when combined to form a matrix array, will provide an optical pattern memory to permit an optical pattern to be directly stored and to be retrieved either in visible form or in analogue output signal form.

9 Claims, 11 Drawing Figures

OPTICAL INFORMATION STORAGE DEVICE

This invention relates generally to a memory device, and particularly to an optical memory element, a plurality of which if properly combined will provide an optical pattern memory array to store optical, two-dimensional or pattern information.

BACKGROUND OF THE INVENTION

In the field of electronic computer and other data processing art, the demand for a larger capacity of data processing system has been ever increasing. As is well known, the capacity of a data processing system depends on the storage capacity of the computer and the quickness in handling data.

Stated otherwise, the capacity of a data processing system cannot be enlarged without increasing the amount of data the computer can handle per second.

In the art of pattern recognition a matter of great concern is to store and retrieve two-dimensional or pattern information directly or without recourse to conversion. Almost all memory device hitherto available, however, do not allow two-dimensional or pattern information to be directly stored and retrieved. More specifically, as a matter of necessity the two-dimensional or pattern information is converted and rearranged in terms of time before storing in or retrieving the same from the associated memory device by, for instance, sweeping and analytically resolving the pattern information in terms of X and Y axes on the CRT. In this connection a large number of information bits must be handled for a single pattern, and hence a high-speed pulse circuit is required in storing and retrieving pattern information from the memory because otherwise, information will be partially lost in the course of handling. These factors together will be partially lost in the course of handling. These factors together will overtax the available memory capacity. As is readily understood from the above, recourse to sweeping and analytic resolving of pattern information is disadvantageous, because the pattern information will be stored and retrieved with poor fidelity and with an extended delay time. Elaborate and complicated devices also become necessary. Accordingly, it is desirous to directly store and retrieve two-dimensional or pattern information from the storage device without recourse to conversion from spatial to time dimension. Also, it is desirous to retouch the stored pattern by electrical means.

As a different mode of storing optical patterns, there is well know the plasma display method in which electric discharges are locally produced an continuously kept in conformity with the optical pattern image in the envelope space. In this method the storage capacity will depend on the number of electrodes used. Therefore, the storage capacity cannot be large. Further, disadvantageously, once the associated power supply has been disconnected, the information stored will be errevocably lost. For a similar purpose liquid crystals are used, but illuminating indication will be impossible.

One object of this invention is to provide a memory device for storing optical information.

Another object of this invention is to provide an optical pattern memory array for storing optical and regenerating information without recourse to conversion from spatial to time dimension.

Still another object of this invention is to provide an optical pattern memory array which allows parts of the stored pattern to be retouched and rewritten by electrical means when required.

SUMMARY OF THE INVENTION

To attain these and other objects according to this invention there is provided an optical information storage and regeneration device comprising a semiconductor plate, an insulator layer, a conductor layer, said semiconductor plate and layers being integrally connected to each other in the order named, and means to store and retrieve optical informations. Also according to this invention there is provided an optical pattern memory array comprising in the form of matrix, a plurality of such optical information storage and regeneration devices which are arranged in the extensive area enough to cover the size of an optical memory pattern to be stored.

BRIEF DESCRIPTION OF THE DRAWINGS

The above and still further objects, features and advantages of this invention will be more apparent from the following description of preferred embodiments when considered in connection with the accompanying drawings, wherein:

Referring to FIG. 1, there is shown an optical storage device in the primary form.

DETAILED EXPLANATION OF THE INVENTION

Figure 5:
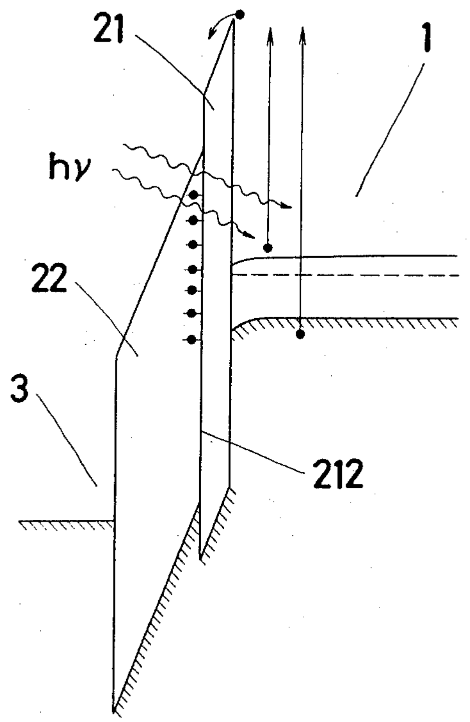
FIG. 5 is an energy-band diagram of the storage device when d.c.-biased and exposed to ultraviolet rays.

In the figures, 1 is a semiconductor, 2 an insulator layer which will have a charge storage region therein, 3 an electric conductive layer, and 4 and 5 electrodes each having an external lead wire.

The surface potential of a Conductor-Insulator-Semiconductor (hereinafter abridged as CIS) composite structure 1 can be given in terms of the flat band voltage $V_{FB}$, which is the gate voltage calculated to equivalently express the degree of band bending due to the electromic charge distribution in the insulator body. The flat band voltage $V_{FB}$ is given by the following equation:

$$V_{FB}=\phi_{cs}-\frac{1}{C_0}\int_0^{X_o}\frac{x_o-x}{x_o}\rho(x)dx \qquad (1)$$

where $X_o$ is the abscissa of the boundary between the conductor layer 3 and the insulator layer 2 (the origin of the coordinate system being on the boundary between the semiconductor 1 and the insulator layer 2); $\rho(x)$ is the quantity of electric charge distributed in the insulator layer; $C_0$ is the electric capacity across the insulator layer and $\phi_{cs}$ is the work function difference between the conductor and the semiconductor.

Figure 1:
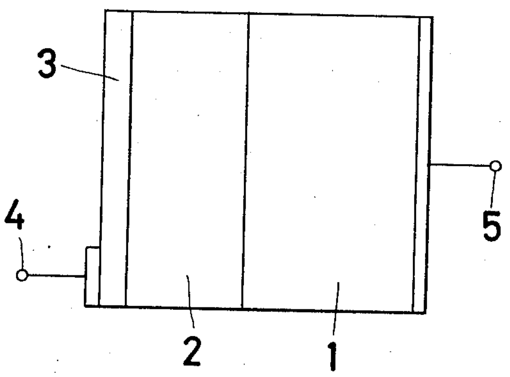
FIG. 1 shows one embodiment of the optical storage device according to this invention.

As seen from this equation, $V_{FB}$ will vary with the electric charge $\rho(x)$ stored in the insulator layer, and if the charge storage region of the insulator layer is stable with time, the information will be stored in the form of $V_{FB}$. The principle of this invention resides in that: the intensity of light or optical input when injected onto the CIS element, is converted and stored in the form of $V_{FB}$, and it will be retrieved in the form of light emitting quantities in proportion with the magnitude of $V_{FB}$ value distributed differently in two dimensional plane. As shown in FIG. 1, the storage element of this invention comprises a semiconductor 1 having an electrode 5 attached to one major surface thereof, an insulator layer 2 integrally connected to the whole area of the other major surface of the semiconductor 1 and a conductor layer 3 applied to the major surface of the insulator layer surface of the insulator layer opposite to the semiconductor. With this arrangement the device will convert the intensity of light into the corresponding analogue quantity of $V_{FB}$ as a result of "charging and discharging" in the charge storage region of the insulator layer, such as the one observed in the floating Si gate and in interface traps in MAOS or MNOS.

The writing or storing process in response to an optical imput or light will be described with reference to FIG. 2. The device of FIG. 2 comprises a semiconductor 1, a $SiO_2$ layer 21, an $Al_2O_3$ layer 22, a transparent conductive layer 3, and electrodes 5 with lead wires. It uses the electric charge trap which will appear on the boundary 212 between two different insulator layers.

Figure 2:
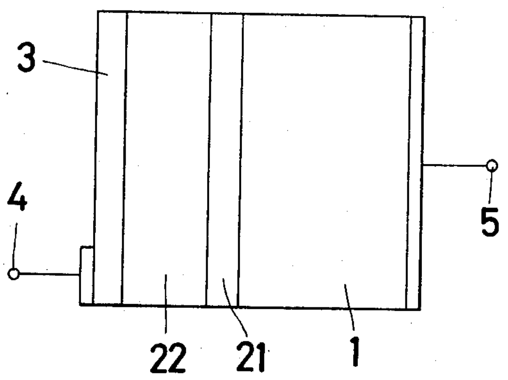
FIG. 2 shows another embodiment of this invention.
Figure 3:
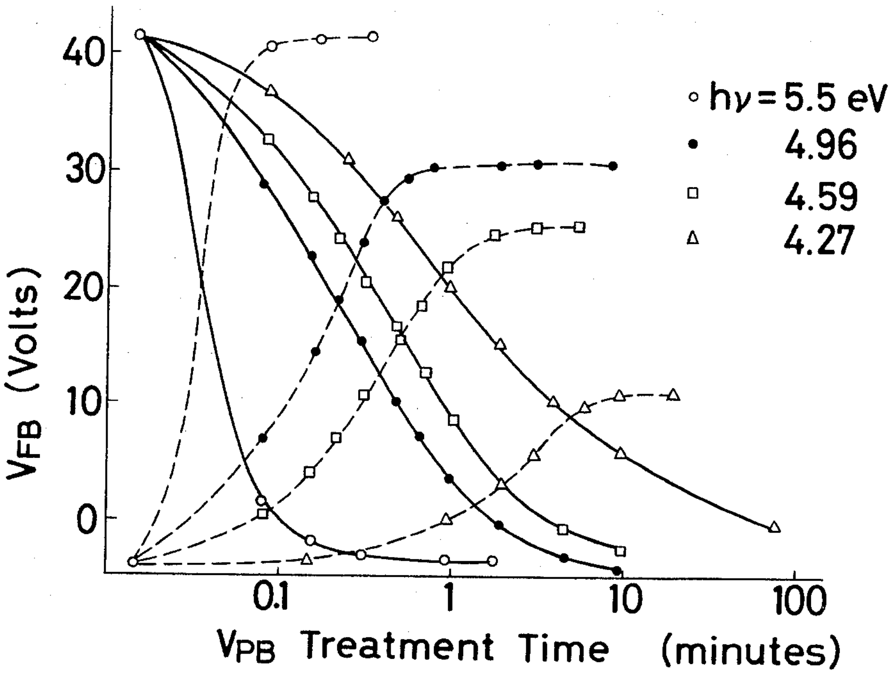
FIGS. 3 and 4 show how $V_{FB}$ will vary in plus and minus bias regions of $V_{PB}$ when the device is exposed to ultraviolet rays.
Figure 4:
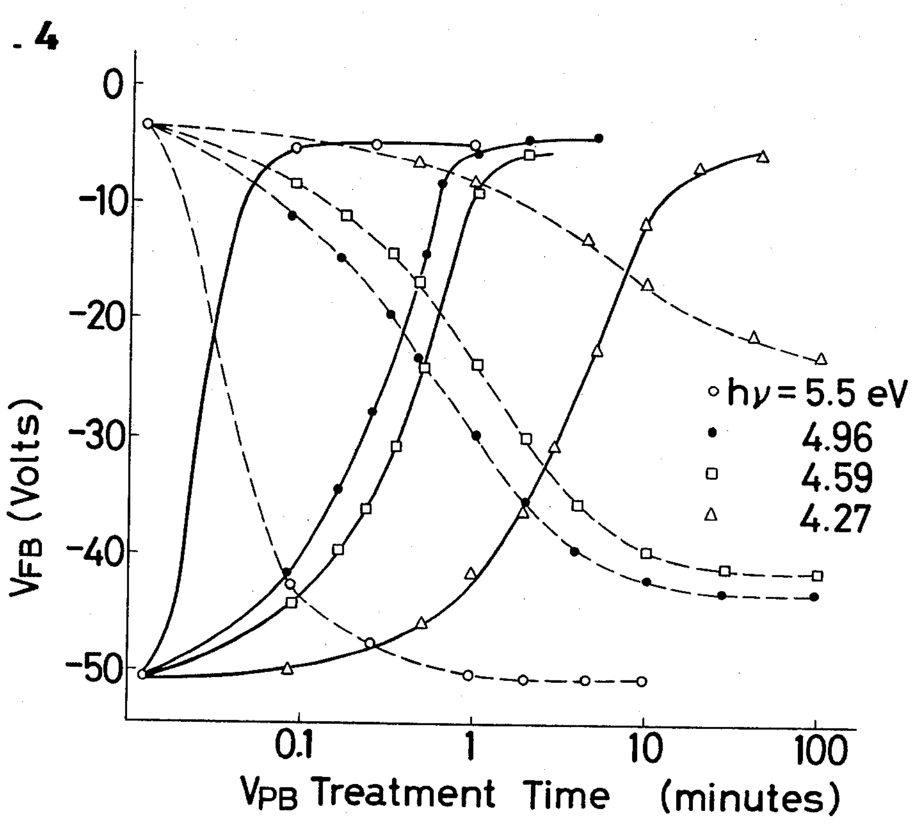

FIGS. 3 and 4 show the experimental data as to how $V_{FB}$ will vary with light. The broken lines of these graphs show how $V_{FB}$ will vary with the treatment time while the device of FIG. 2 is exposed to ultraviolet rays in instances where plus and minus bias voltages $V_{FB}$ (+50 V in FIG. 3, and −50 V in FIG. 4) are applied to one electrode 4 of the device while maintaining the other electrode 5 at ground potential. Before the device is subjected to the test, the electrodes 4 and 5 of the device are short-circuited and the device is exposed to ultraviolet rays until it has been brought to the balanced equibrium condition for a small valve of $V_{FB}$.

FIG. 3 shows that electric charges are entrapped on the boundary 212. FIG. 4 likewise, shows that positive holes are entrapped on the boundary 212. The solid lines of FIGS. 3 and 4 show how $V_{FB}$ will transiently vary with time while the device of FIG. 2 is exposed to ultraviolet rays in instances where no bias voltage is applied to the device. Before the device is subjected to the test, plus and minus bias voltages (+50 V in FIG. 3, and −50 V in FIG. 4) are applied to the device, and the device thus electrically biased is exposed to ultraviolet rays until it has been brought in the balanced equilibrium condition. This second test may be considered as being equivalent to the state in which electric charges or positive holes entrapped on the boundary 212 are released, thus allowing the bias voltage $V_{FB}$ to reach zero. The device actually tested was composed of N-type Silicon layer 1 (10Ω-cm), $SiO_2$ layer 21 (1,700A), $Al_2O_3$ layer 22 (2,800A) and Au film 3 (200A). The energy of the ultraviolet rays was within the range from 4.27 eV to 5.5 eV.

Figure 6:
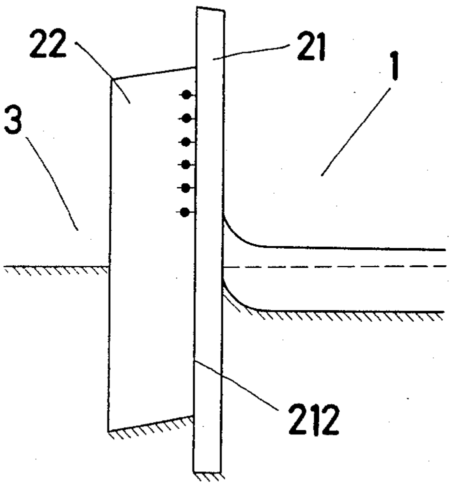
FIG. 6 is a similar diagrammatic representation of the storage device when exposed to ultraviolet rays, causing the corresponding change of $V_{FB}$.

The phenomenon mentioned above will be understood from the following explanation when considered in connection with FIGS. 5 and 6. FIG. 5 shows the band diagram of the CIS element in instances where the element is d.c.-biased and exposed to ultraviolet rays. FIG. 6 shows another band diagram of the device when the d.c. bias voltage is removed after the interruption of exposure to ultraviolet rays. As seen from these drawings, electric charges tend to selectively and locally occupy the trap on the boundary at the place to which ultraviolet rays are projected, and $V_{FB}$ will accordingly vary. If ultraviolet rays are again projected on the device and no bias is applied between gates and the substrate, the electric charges or positive holes will be released from the trap, thus causing $V_{FB}$ to be zero. This corresponds to the erase of the information stored in the form of $V_{FB}$. The device using an N-type semiconductor is described in connection with FIGS. 5 and 6. The above, however, is true in principle with the device using a P-type semiconductor.

Figure 7:
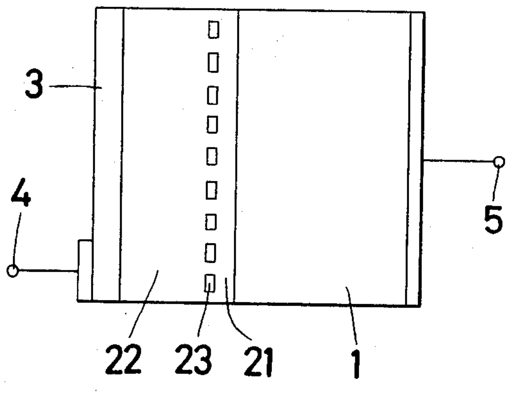
FIGS. 7, 8 and 9 show different embodiments of the optical storage device of this invention.

Electric charge can be stored in the device of FIG. 2 which has a double insulator layer such as $Si_3N_4$-$SiO_2$, or a single insulator layer such as $Al_2O_3$ or $Si_3N_4$. Also, a similar result can be attained in a device having a plurality of conductive pieces 23 such as floating Si gates spaced and embedded in the ihsulator body as shown in FIG. 7. Electric charge will be injected from either semiconductor or conductor layer under the influence of light, and will be retained in the state of charging the conductor pieces with electronic charges. Obviously, the efficiency will be improved by using transparent conductor pieces 23 in the insulator layer.

Now the process according to which the information can be retrieved or read from the storage device of this invention, will be explained. One useful method is to indicate the stored information in the form of luminescence emanating from the semiconductor substrate, when demanded.

Figures 8, 9:
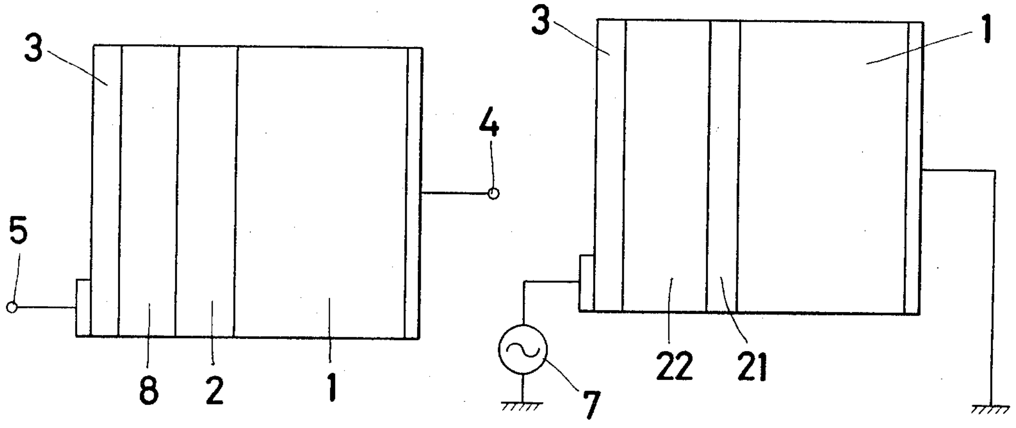

The embodiment which allows the stored information to appear in the form of luminescence is shown in FIG. 8. In the drawing, the same references as used in FIGS. 1, 2 and 7 are used to indicate the same parts of the device. 7 is an a.c. power supply which is used to apply an a.c. voltage across the device. The luminescence from the semiconductor substrate having $V_{FB}$ of an equal uniform value over the whole surface area was discussed in "IEEE Transaction Electron Devices," ED-Vol. 16, No. 7, p. 641 (1969). As stated therein the intensity of luminescence I is given by:

$$I = \gamma f h\nu\epsilon i/qx_i\ (V_o - V_B - V_{FB} - Xi/\epsilon i\ \sqrt{2q\epsilon_s NV_B}) \qquad (2)$$

where $V_o$ and $f$ are the amplitude and frequency of an a.c. voltage applied across the device; $\gamma$ is the quantum efficiency; $h\nu/q$ is the average value of the photon energy ejected; $\epsilon_i$ and $x_i$ are the dielectric constant and thickness of the dielectric material; $V_B$ and $\epsilon_s$ are the break-down voltage and dielectric constant of the semiconductor; N is the carrier density on the semiconductor surface; and $q$ is the electric charge carried by an electron. As is apparent from the equation, in the domain of $V_{FB} < V_D - V_B - \sqrt{2q\epsilon_s NV_B}.\ x_i/\epsilon_i$ the intensity of luminescence will decrease proportional to $V_{FB}$, and can be reproduced in the form of analogue quantity. In the domain of $V_{FB} > V_o - V_B - \sqrt{2q\epsilon_s NV_s}.\ x_i/\epsilon_i$, however, the intensity of luminescence will be zero. If a large number of CIS elements are arranged in the form of a matrix array, and if an optical pattern image is stored in the form of spatial distribution of different values of $V_{FB}$, the intensity of luminescence emanating from the matrix will be accordingly modulated, causing the appearance of the same luminescent pattern as the optical imput.

Another method is to use the extra electric charge locally appearing in gates region on the semiconductor surface. This extra electric charge will appear as a result of induction by the electric charge which is injected under the influence of light and retained in the device. More specifically, light whose wave length is longer than that of the light used in writing or storing information, is projected on the major surface of the storage device, and the reflected or transmitted light can be used in retrieving or reading the information. Such light is affected or modulated by the variation of the reflection or transmittance coefficient of the device. analogus of The embodiment as shown in FIG. 9 makes full use of the principle above mentioned. 8 is a film composed of a liquid crystal or other materials whose reflection or transmittance coefficient will vary with the strength of electric field applied thereto. An electric field is applied across the device, and the strength of the electric field will be modified by the amount of electric charge stored in the insulator layer 2. Therefore, the reflection or transmittance coefficient of the film 8 will be modulated by the electric charge stored in the device. Thus, the device when exposed to the reading out light, will produce a optical image to indicate the information stored in the insulators.

As is apparent from the above, this invention makes it possible to store and provide optical information in the two-dimensional phase. Also, this invention makes it possible to present optical information in the form of electric signals.

Figure 10:
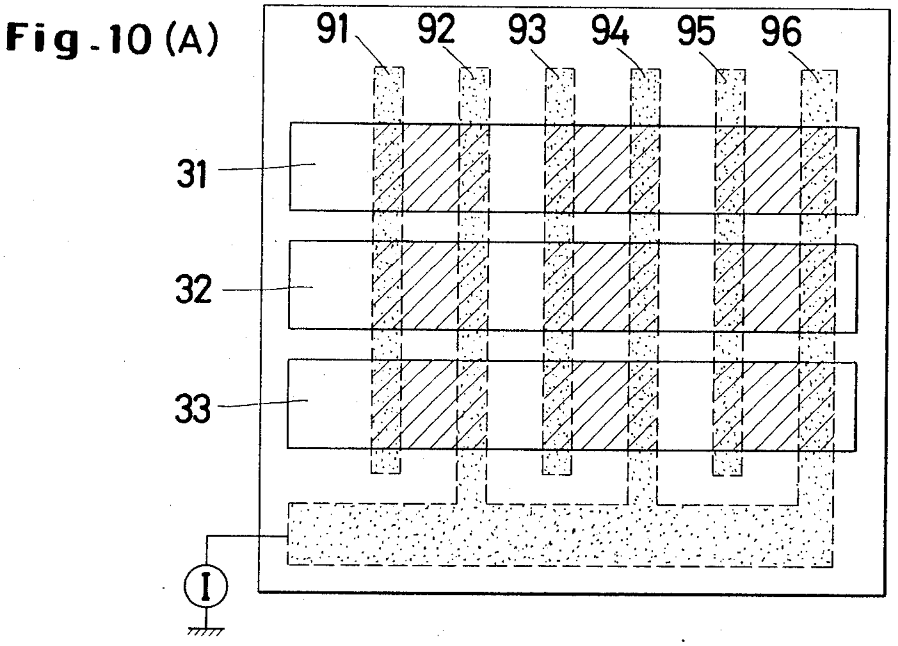
FIG. 10 composed of FIGS. 10A and 10B shows one embodiment of an optical pattern memory array of this invention.
Figure 10:
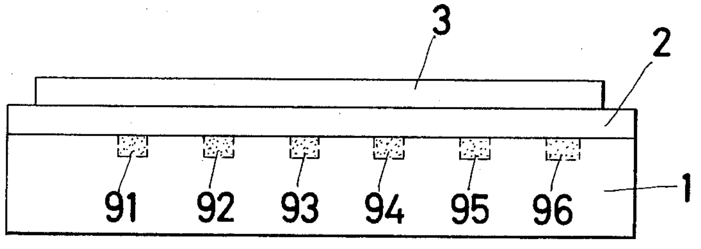

Referring to FIG. 10, there is shown a fragment of an optical pattern memory matrix composed of storage elements. The areas 91–96 surrounded by broken lines are isolated by the PN junctions from the substrate 1. Transparent metal strips 31, 32 and 33 function as gate electrodes. For the sake of simplicity in explanation assume that the substrate 1 is made of a P-type semiconductor, and that the area of the substrate other than the hatched portions is of $P^+$ type, so as not to convert the surface of the substrate to N-type conductivity. The areas 91–96 are of $N^+$, composing pairs of 91–92, 93–94 and 95–96, and serving as drain and source regions.

In storing two-dimensional information in the optical memory matrix, positive charges proportional to the amount of light are injected into the insulator layer. In reading the information thus stored, for instance, in reading the information bit stored at the intersection between the transparent electrode 31 and the areas 91–92, negative bias voltage is applied to each of the electrodes 32 and 33, but no bias voltage is applied to the electrode 31, whereas a small magnitude of negative bias voltage is applied to the area 91, but no bias voltage is applied to the areas 93 and 95. Then, only the hatched area composed of the stripes 91–92 and the electrode 31 will allow electric current to flow between the two $N^+$ stripes. Therefore, it is possible to measure the electric current which is proportional to the amount of electric charge stored in the associated part of the insulator layer. The effective area of the matrix can be swept by applying a train of bias voltage pulses in terms of line and row. As is apparent from the above, the electrical access to the pattern information stored in the matrix is possible without multi-layer wiring. In the matrix having P-N junction regions incorporated therein, the luminescent indication can be used together with the electrical access. The luminescence of P-N junction can be modulated by using the variation of the injection rate, recombination rate and other factors due to the surface potential surrounding the P-N junction. The above description is made with reference to the P-type substrate. However, the behavior f the N-type substrate will be inferrable from the above, taking into consideration the different barrier values of electrons and positive holes with respect to a given insulator material and other different factors.

The conductivity type of the substrate and the kind of the charge carrier can be arbitrarily selected so as to meet such occasional requirements as the bias voltage sign more advantageous in designing, or as the state positive or negative of image required.

As is apparent from the above, the first advantage of this invention is to allow the storage and regeneration of optical information in the two-dimensional form, and the second advantage of this invention is to allow the storage of optical informations in the form of analogus signal. These will make the optical information device much simpler than the conventional device. More specifically, in the prior art an optical information is converted into electric signals by a camera tube, and the electric signals are stored in a videorecorder. In retrieving the optical informations thus stored it is necessary to supply such electric signals to an array of luminescent diodes. In this invention an optical pattern information when projected to the memory array, will be stored in the two-dimensional form, and in retrieving the optical information pattern thus stored, the selective application of proper bias voltage to the electrodes of the memory array will suffice.

The third advantage of this invention is to erase or retouch parts of the stored information with easiness by electric or photo electric method. This will permit the repetative use of memory device. The repetative use is impossible in storing optical informations in the photo-film as has been hitherto done.

The fourth advantage of this invention is to allow the reading of information with electricity. Multi-wiring is unnecessary, and analogous electric signals which will vary with the intensity of light, can be produced. As is readily forseen from the above, this invention will much improve the optical pattern memory such as used in displaying optical informations in the two-dimensional area.

What we claim is:

1. An optical information storage and regeneration device comprising in combination, a semiconductor substrate, an insulating layer disposed on a main surface of said semiconductor substrate, a charge storage means inbedded in said insulating layer, a conductor layer insulated by said insulating layers from said semiconductor substrate, stored electronic charges in said charge storage means of said insulating layer being changed by amounts of incident optical rays and amounts of a electrical signal applied between said conductor layer and parts of said semiconductor substrate, and a means for optically regenerating information which is represented by a plane distribution of said amount of stored electronic charges in said charge storage means, the output of said regenerated optical information being modulated according to said amount of electronic charges in said charge storage means.

2. The optical information storage and regeneration device according to claim 1, having means for regenerating optical information which modulates a light intensity generated by a P-N junction in said substrate according to said amount of stored charges in said charge storage means.

3. The optical information storage and regeneration device according to claim 1, having means for regenerating optical information which modulates a light intensity generated in said semiconductor substrate by applying a large a.c. signal to said conductor-insulator-semiconductor structure according to said amount of stored charges in said charge storage means.

4. The optical information storage and regeneration device according to claim 1, having a liquid crystal layer between said insulator and conductor layer, a means for optically regenerating information which modulates the change in the optical properties of said liquid crystal provided on said insulating layer according to said amount of stored charges in said charge storage means.

5. The optical information storage device according to claim 1 wherein said insulator layer is of a single layer composition.

6. The optical information storage device according to claim 1 wherein said insulator layer is composed of a double layer composition.

7. The optical information storage device according to claim 6 wherein said double insulator layer is made of $Si_3N_4$-$SiO_2$ or $Al_2O_3$-$SiO_2$.

8. The optical information storage device according to claim 1 wherein said insulator layer has conductor pieces incorporated therein.

9. The optical information storage device according to claim 8 wherein said conductor pieces and conductor layer are transparent.

* * * * *